(12) United States Patent
Podgorski et al.

(10) Patent No.: US 10,385,725 B2
(45) Date of Patent: Aug. 20, 2019

(54) ABRADABLE COATING MADE OF A MATERIAL HAVING A LOW SURFACE ROUGHNESS

(71) Applicant: SAFRAN AIRCRAFT ENGINES, Paris (FR)

(72) Inventors: Michael Podgorski, Paris (FR); Philippe Charles Alain Le Biez, Draveil (FR); Ludovic Edmond Camille Molliex, Brunoy (FR); Serge Selezneff, Issy les Moulineaux (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 14/418,268

(22) PCT Filed: Aug. 5, 2013

(86) PCT No.: PCT/FR2013/051888
§ 371 (c)(1),
(2) Date: Jan. 29, 2015

(87) PCT Pub. No.: WO2014/023906
PCT Pub. Date: Feb. 13, 2014

(65) Prior Publication Data
US 2015/0211382 A1    Jul. 30, 2015

(30) Foreign Application Priority Data

Aug. 7, 2012    (FR) ..................................... 12 57657

(51) Int. Cl.
*F01D 25/00*    (2006.01)
*B22F 3/105*    (2006.01)
(Continued)

(52) U.S. Cl.
CPC ............ *F01D 25/005* (2013.01); *B22F 3/105* (2013.01); *B22F 7/08* (2013.01); *C23C 30/00* (2013.01);
(Continued)

(58) Field of Classification Search
CPC ...... F01D 11/122; F01D 25/005; F01D 5/284; F01D 5/286; F01D 5/288; B22F 3/105; B22F 7/08; Y10T 428/24413
See application file for complete search history.

(56) References Cited

U.S. PATENT DOCUMENTS 3,413,136 A * 11/1968 Emanuelson ............. C23C 4/02
                                                               427/353
4,269,903 A *  5/1981 Clingman ................. C23C 4/18
                                                               415/173.4
(Continued)

FOREIGN PATENT DOCUMENTS

EA          013342 B1    4/2014
EP       0 185 603 A1    6/1986
(Continued)

OTHER PUBLICATIONS

Thompson et al. (Superalloys, Sintering of the Top Coat in Thermal Spray TBC Systems Under Sevice Conditions, The Minerals, Metals and Materials Society) (Year: 2000).*
(Continued)

*Primary Examiner* — Frank J Vineis
*Assistant Examiner* — Alicia J Sawdon
(74) *Attorney, Agent, or Firm* — Oblon, McClelland, Maier & Neustadt, L.L.P.

(57) ABSTRACT

The present invention relates to an abradable coating for a turbine engine part, characterized by the fact that said coating includes a layer made of an abradable material, the surface asperities of which are filled with thermally bonded
(Continued)

ceramic grains, forming a smooth, free surface having a low roughness.

6 Claims, 1 Drawing Sheet

(51) Int. Cl.
    *B22F 7/08*     (2006.01)
    *C23C 30/00*     (2006.01)
    *F01D 11/12*     (2006.01)
    *F01D 5/28*     (2006.01)
    *C23D 5/02*     (2006.01)
    *C23D 5/00*     (2006.01)

(52) U.S. Cl.
    CPC ............... *C23D 5/02* (2013.01); *C23D 5/10* (2013.01); *F01D 5/284* (2013.01); *F01D 5/286* (2013.01); *F01D 5/288* (2013.01); *F01D 11/122* (2013.01); *Y02T 50/673* (2013.01); *Y02T 50/6765* (2018.05); *Y10T 428/24413* (2015.01)

(56) References Cited

U.S. PATENT DOCUMENTS

| | | | | |
|---|---|---|---|---|
| 4,321,310 A | * | 3/1982 | Ulion | C23C 14/024 428/612 |
| 4,594,053 A | * | 6/1986 | Sohngen | F01D 11/125 277/414 |
| 5,017,402 A | * | 5/1991 | McComas | F01D 5/20 427/446 |
| 5,024,884 A | * | 6/1991 | Otfinoski | B22F 3/26 415/174.4 |
| 5,064,727 A | * | 11/1991 | Naik | C23C 30/00 415/173.4 |
| 5,397,649 A | * | 3/1995 | Schienle | C23C 4/02 428/552 |
| 6,465,090 B1 | * | 10/2002 | Stowell | C04B 41/009 416/241 B |
| 2006/0228541 A1 | * | 10/2006 | Yasui | C23C 4/18 428/319.3 |
| 2008/0145649 A1 | * | 6/2008 | Mannem | C10M 111/00 428/336 |
| 2008/0273985 A1 | * | 11/2008 | Fairbourn | F01D 5/288 416/241 B |
| 2009/0110903 A1 | * | 4/2009 | Margolies | C23C 4/02 428/304.4 |
| 2009/0136740 A1 | | 5/2009 | Reynolds et al. | |
| 2010/0143103 A1 | * | 6/2010 | Sellars | F01D 11/122 415/173.4 |
| 2012/0141671 A1 | | 6/2012 | Fairbourn | |

FOREIGN PATENT DOCUMENTS

| | | |
|---|---|---|
| EP | 1 484 427 | 12/2004 |
| EP | 2 067 872 | 6/2009 |
| JP | 3-40105 B2 | 6/1991 |
| RU | 2 094 529 C1 | 10/1997 |
| RU | 2 353 779 C2 | 4/2008 |
| RU | 2 423 203 C2 | 7/2011 |
| WO | WO 95/12004 A1 | 5/1995 |

OTHER PUBLICATIONS

Selezneff, S., et al., "Thermal cycling behavior of EBPVD TBC systems deposited on doped Pt-rich Y—Y$^1$ bond coatings made by Spark Plasma Sintering (SPS)", Surface & Coatings Technolgoy, vol. 206, No. 7, pp. 1558-1565, (Jun. 28, 2011) XP 028126170.
International Search Report dated Dec. 5, 2013 in PCT/FR13/051888 Filed Aug. 5, 2013.
Russian Office Action dated Jul. 3, 2017 in Patent Application No. 2015103522 (English Translation only).
Office Action as received in the corresponding EP Patent Application No. 13 758 936.2-1103 dated Jul. 11, 2018.

* cited by examiner

ABRADABLE COATING MADE OF A MATERIAL HAVING A LOW SURFACE ROUGHNESS

TECHNICAL FIELD

The present invention relates to the field of turbine engines and relates to a coating made of abradable material forming a seal element between turbine engine stator and rotor parts. It relates more particularly to a coating of this type having low surface roughness.

PRIOR ART

A turbine engine is a rotary machine in which energy transfer can take place between a fluid and a bladed system which is rigidly connected to a rotor, for example a compressor or a turbine forming part of a turboshaft engine such as a gas turbine engine. A turboshaft engine with a gas turbine for an aircraft, such as a multi-flow turbojet engine, generally comprises, in the direction of flow of the gases, that is to say from upstream to downstream, a fan, one or more compressor stages, a combustion chamber, one or more turbine stages and a gas exhaust pipe.

Coatings made of abradable material—referred to in this way since they are capable of being worn by abrasion—are provided on the internal face of stator parts, casings for example, inside which or facing which rotating parts move, such as the bladed systems of compressor or turbine rotors or the blades forming knife-edge seals of a labyrinth seal. In order to reduce gas leakages on either side of the seal formed by the end of the rotating part and the coating of the stator part, clearance that is as low as possible is provided between them. However, during an operating cycle of the turbine engine this clearance is liable to be reduced or even cancelled out. To prevent damage to the moving parts, the static element of the seal is allowed to deform or to be machined by the ends of said rotating parts, during operating phases where dimensional variations occur giving rise to an interaction of the parts with each other with contact. In this way the detrimental effects of this contact are minimised, both with regard to the structure of said ends of said rotating parts, and with regard to said internal surface of said stator elements.

An abradable material must have the following properties: it must obviously have good abradability; it must further withstand the temperatures of the environment in which it is intended to work (500° C. to 1200° C., for example inside casings of aircraft engines); it must also withstand erosion through repeated impacts of abrasive particles (detached during the contact mentioned above); the manufacturing and assembly costs thereof must also be as small as possible.

One known abradable material is produced from an alloy of the MCrAlY type, M being selected from Ni, Co, NiCo or CoNi. For example a mixture of an MCrAlY base alloy and a porogenic agent (aromatic polyester) is known by the trade name METCO™ 2043. Such a material, obtained according to a technique of thermal spraying of powder onto a substrate, would be suitable for forming a coating inside a compressor or turbine casing facing the rotor blades thereof; it also withstands a temperature of up to 1200° C. to which the parts are subjected in operation. However, for this material, after the pyrolysis step necessary for the formation of the pores by elimination of the porogenic agent, a relatively rough surface finish is obtained, for example Ra+12 µm. Such a surface roughness is unfavourable from the point of view of the efficiency of the turbine engine since it gives rise to a significant reduction in the aerodynamic performance because of the increase in the limit layer in the gas stream. In the case of an engine, the roughness of the available material thus has an impact on the specific consumption thereof.

PRESENTATION OF THE INVENTION

The main object of the invention is the production of a coating made of abradable material, the surface finish of which does not have a negative impact on the efficiency of the turbine engine and incidentally on the specific consumption of the engine.

The object of the invention is thus the production of a coating made of abradable material having a porous structure, the surface of which has a roughness of less than 6 µm (Ra<6 µm).

Another object of the invention is a coating made of abradable material that withstands temperatures of up to 1200° C. This temperature corresponds to that which the substrate supporting the coating is capable of withstanding.

Another object of the invention is a coating made of abradable material which also does not confer thereon abrasive or fragile behaviour.

The applicant has already developed a coating made of porous abradable material having an additional layer with a smooth surface. This coating was the subject matter of the filing of a patent application FR 1157729. The smooth character of this additional layer is obtained by grinding a thin layer deposited on the porous abradable material. This layer is in particular applied by thermal spraying.

The applicant has now developed a new coating made of abradable material.

The coating made of abradable material according to the invention, for a turbine engine part, is characterised in that it comprises a layer of abradable material of which the surface irregularities are filled in by thermally bound ceramic grains, the free surface of the layer of abradable material having low roughness.

In particular, the ceramic grains are bound by partial sintering and the smooth free surface with low roughness has a roughness of less than 6 µm (Ra<6 µm). By using a filling material based on grains with a low granulometry, such as grains with a granulometry of 0.3 µm, a result which achieves the objects of the invention is obtained without having to machine the coating.

The material filling in the surface irregularities comprises any type of ceramic material: oxide, carbide, nitride, oxycarbide, carbonitride, etc. Preferably it is an oxide ceramic because of the stability of this material in an oxidising environment. Advantageously, it is at least one of the following materials: alumina, zirconia, yttriated zirconia, mullite or yttria. Preferably materials are selected having thermal expansion coefficients close to those of the initial abradable material. In addition, the ability to be sintered at low temperature is necessary.

The invention relates to an abradable coating, the layer of abradable material of which is porous and comprises for example an alloy with the composition MCrAlY, with M selected from Ni, Co, NiCo or CoNi, a zirconium oxide or an Ni-graphite compound.

In accordance with another feature, the ceramic grains forming the filling material penetrate the abradable material over a depth of between 50 and 1000 µm.

The invention also relates to a method for applying an abradable coating to a substrate, comprising, after the production of an abradable layer on said substrate, a step of applying a powder made of ceramic material to said layer so as to fill in the surface irregularities, and then heat-treating the coating so as to bind the powder.

The granulometry of the ceramic powder in particular is selected so that it is less than the size of the porosities forming the irregularities of the abradable material. In particular when the porosities are produced by heat treatment, the powder is applied after the treatment in order to produce the pores.

Advantageously, the powder is applied to the abradable material in the form of a slip comprising a suspension of the powder in water optionally together with a dispersant, such as nitric acid, and optionally also an organic binder.

The partial sintering heat treatment is carried out a temperature below 1200° C. The sintering is said to be partial since the material obtained is not a dense material. No pressure is exerted during the heat treatment. Furthermore, a dense material cannot be produced via a short heat treatment at these temperatures without exerting pressure. There is only a phenomenon of diffusion at the points of contact between the grains.

The binding heat treatment can also be carried out by the local application of a laser beam of suitable power or any other means affording local heating, in particular on a surface area of not more than 1000 µm in diameter.

PRESENTATION OF THE FIGURES

Other features and advantages will emerge upon reading the detailed description of a non-limitative embodiment of the invention, with reference to the drawings, in which.

DETAILED DESCRIPTION OF THE INVENTION

Figure 1:
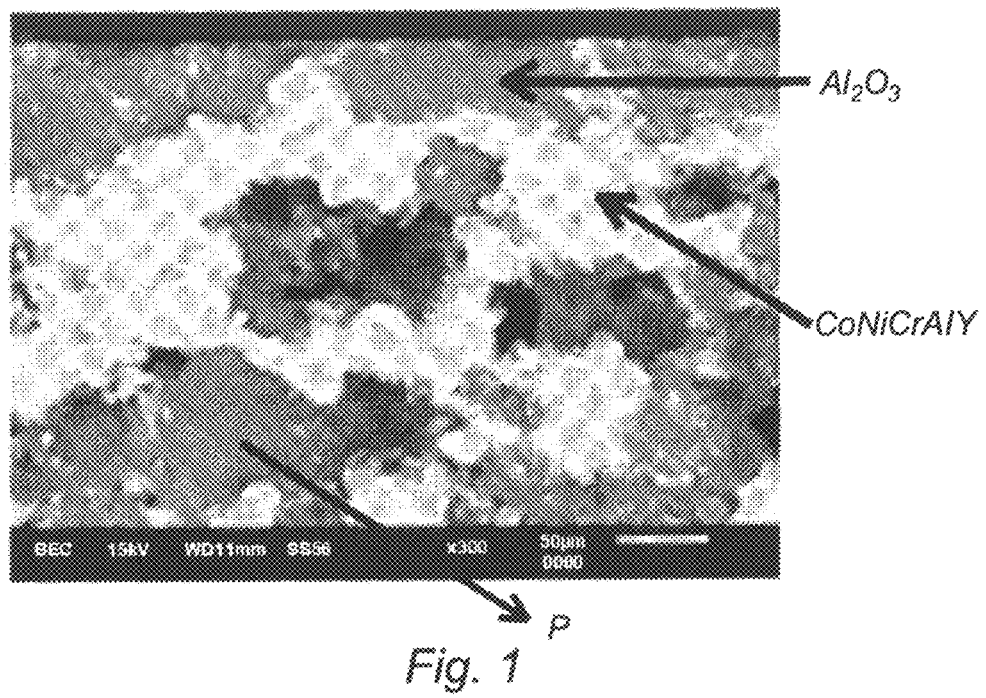
FIG. 1 shows a photographic view in cross section of a coating of the invention with a first magnification.

The following example relates to a high-pressure radial compressor of a gas turbine engine; the cover of the wheel, made of steel such as that known by the designation INCOLOY® alloy 909, is covered on its internal face with an abradable coating over a thickness of 1 mm. The coating was produced by the thermal spraying of a CoNiCrAlY alloy associated with a porogenic agent such as an aromatic polyester, sold under the name METCO™ 2043. The production of the abradable material comprises a step of pyrolysis of the porogenic agent during which the pores are created within the material.

On the surface of the material, the pores form irregularities that have to be filled in. In accordance with the invention, a powder of a ceramic material is deposited on the surface of the abradable material so as to fill in the surface porosity.

Here, the material is alumina, which has the advantage of being stable at the operating temperature of the turbine engine and of being an oxide and therefore not sensitive to oxidation phenomena.

The alumina powder is preferably provided in the form of an aqueous slip, the viscosity parameters and load factor of which, in particular, are determined so as to make it possible to cover the material optimally and to control the penetration depth, between 50 and 1000 µm.

The granulometry of the powder is selected according to the size of the pores to be filled in in the abradable material.

The granulometry of the powder is between 0.1 and 15 µm and is for example less than 1 µm.

A ceramic grain size of less than 1 µm makes it possible to effect a grain binding treatment at a temperature compatible with that which can be withstood by the abradable material substrate.

If, however, the maximum temperature acceptable to the substrate is less than that acceptable to the abradable material, then local cooling of the substrate is advantageously established, for example by means of cooling coils.

The procedure for smoothing via the ceramic material is as follows:

Preparation of a slip by mixing the alumina powder at the appropriate granulometry, for example 0.3 µm, with water in the presence of a dispersant such as nitric acid and optionally an organic binder, such as PVA (polyvinyl alcohol);

Deposition of the slip on the surface of the abradable material;

Removal of the excess by scraping the surface;
  If the porosity is closed then only the surface porosity is filled in,
  If the porosity is open, the infiltration depth is governed by the number of passes; a penetration depth greater than the maximum touch depth is then aimed for, so as to preserve a low roughness even in the case of touching;

Drying in the open air or in an oven;

Heat treatment at 600° C. for 4 hours so as to eliminate the PVA if necessary and to bind the ceramic grains together. Partial sintering is carried out so as to bind the grains in a microporous alumina phase, which is both neither too fragile so as not to lose its cohesion during operation of the turbine engine before any contact, nor too strong so as to prevent behaviour that is no longer abradable but abrasive.

The solution of the invention made it possible to obtain a coating with a smooth surface of Ra<1 µm. A gain in specific consumption was estimated at 0.4% in relation to such roughness compared with a roughness of 12 µm of the prior art.

Figure 2:
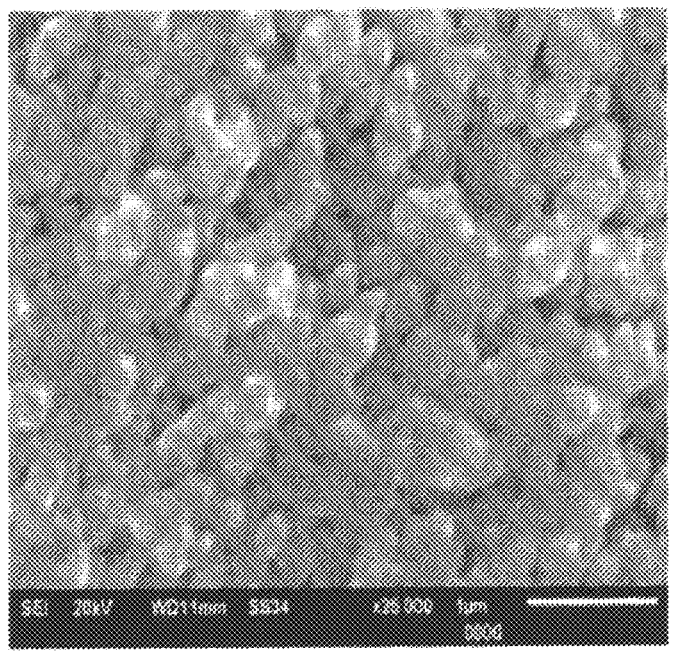
FIG. 2 shows a detail of the view of FIG. 1 with greater magnification.

In FIGS. 1 and 2, depicting in cross section the coating of the invention, the abradable material CoNiCrAlY can be seen in light print with the filled pores P being in dark print, and the alumina $Al_2O_3$ also visible on the surface, smoothing the irregularities formed by the surface pores. FIG. 1 shows a free surface of the abradable coating comprises portions of the CoNiCrAlY alloy and the alumina. FIG. 2, produced with greater magnification compared with FIG. 1, shows the cohesion between the alumina grains.

The present invention is not limited to the formation of a smooth abradable coating on a compressor casing but applies to any part when this presents an advantage or interest.

The alumina can be replaced by any other ceramic material in so far as it can be in the form of a sufficiently reactive powder to be able to carry out partial sintering at relatively low temperatures, according to the temperature resistance of the substrate. Oxides are preferred.

The abradable material cited in the example is METCO™ 2043: the invention is not limited to this. Ni graphite 75/25, METCO™ 2460, METCO™ 310 or METCO™ 314 can also be cited. It should be noted that the materials Ni graphite 75/25, METCO™ 310 and METCO™ 314 do not contain any polyester to be pyrolised in order to obtain porosities. The porosities come directly from the process of depositing the abradable material.

The invention claimed is:

1. A turbine engine part, comprising at least one stator part, and a rotating part, the rotating part inside the stator part or facing the stator part, the at least one stator part comprises an internal face that comprises a layer of a MCrAlY abradable coating wherein M is selected from the group consisting of Ni, Co, NiCo, and CoNi, wherein the layer of the MCrAlY alloy forms a seal between the stator part and the rotating part, wherein the layer of the abradable coating has surface irregularities filled in by thermally bound ceramic grains that are alumina, wherein the ceramic grains penetrate the layer of the abradable coating over a depth of between 50 and 1000 µm, wherein the ceramic grains are bound by partial sintering, wherein a ceramic grain size is less than 1 µm, wherein the layer of the abradable coating has a surface roughness of less than 1 µm and wherein a free surface of the layer of the abradable coating comprises portions of the MCrAlY alloy and the alumina.

2. The turbine engine part of claim 1, wherein M is Ni.
3. The turbine engine part of claim 1, wherein M is Co.
4. The turbine engine part of claim 1, wherein M is NiCo.
5. The turbine engine part of claim 1, wherein M is CoNi.
6. The turbine engine part of claim 1, wherein the MCrAlY abradable coating further comprises a porogenic agent.

* * * * *

UNITED STATES PATENT AND TRADEMARK OFFICE
CERTIFICATE OF CORRECTION

PATENT NO. : 10,385,725 B2  
APPLICATION NO. : 14/418268  
DATED : August 20, 2019  
INVENTOR(S) : Michael Podgorski et al.

Page 1 of 1

It is certified that error appears in the above-identified patent and that said Letters Patent is hereby corrected as shown below:

On the Title Page

In Column 2, item (56), Other Publications, Line 2, "Sevice" should read --Service--;

Page 2, Column 2, item (56), Other Publications, Line 2, "Y-Y$^1$" should read --Y-Y'--;

In the Claims

Column 5, Line 18, Claim 1, "1 μm and" should read --1 μm, and--.

Signed and Sealed this  
Twelfth Day of May, 2020

Andrei Iancu  
*Director of the United States Patent and Trademark Office*